United States Patent [19]

Söderlund

[11] Patent Number: 5,411,388
[45] Date of Patent: May 2, 1995

[54] ROTARY SCREW MACHINE WITH THRUST BALANCED BEARINGS

[75] Inventor: Frits Söderlund, Saltsjöbaden, Sweden

[73] Assignee: Svenska Rotor Maskiner AB, Stockholm, Sweden

[21] Appl. No.: 211,677

[22] PCT Filed: Nov. 5, 1992

[86] PCT No.: PCT/SE92/00767
§ 371 Date: Apr. 12, 1994
§ 102(e) Date: Apr. 12, 1994

[87] PCT Pub. No.: WO93/10333
PCT Pub. Date: May 27, 1993

[30] Foreign Application Priority Data

Nov. 13, 1991 [SE] Sweden ............................ 9103337

[51] Int. Cl.$^6$ ............................................ F04L 18/16
[52] U.S. Cl. ........................................ 418/203; 384/517
[58] Field of Search .......................... 418/203; 384/517

[56] References Cited

U.S. PATENT DOCUMENTS

| 4,227,755 | 10/1980 | Lundberg | 308/184 R |
| 4,462,769 | 7/1984 | Schibbye et al. | 418/203 |
| 4,730,995 | 8/1988 | Dewhirst | 418/203 |
| 4,915,514 | 4/1990 | Söderlund | 418/203 |

FOREIGN PATENT DOCUMENTS

WO91/17345 11/1991 WIPO .

Primary Examiner—Richard A. Bertsch
Assistant Examiner—Charles G. Freay
Attorney, Agent, or Firm—Frishauf, Holtz, Goodman & Woodward

[57] ABSTRACT

In a rotary screw machine, a shaft journal (7) of one of the rotors (6) is mounted in main thrust bearings (9, 10) and a balancing thrust bearing (11), the latter being located outermost on the shaft journal (7). The main thrust bearings (9, 10) are clamped towards the low pressure end of the machine. The balancing thrust bearing (11) is affected by a thrust balancing device for counter-acting the gas forces on the rotor (6), thereby reducing the force that has to be transferred by the main thrust bearing.

12 Claims, 1 Drawing Sheet

ROTARY SCREW MACHINE WITH THRUST BALANCED BEARINGS

BACKGROUND OF THE INVENTION

The present invention relates to a rotary screw machine for a gaseous working medium with at least one screw rotor operating in a casing including a low and a high pressure end section, which rotor at operation is exposed to axial gas forces in a direction from the high pressure end section towards the low pressure end section, defined as the positive axial direction. The rotor has at least one shaft journal mounted in beatings in one of said end sections, which beatings include thrust bearing means with main thrust bearing means adjacent the rotor and balancing thrust bearing means adjacent the outer end of the shaft journal, which thrust bearing means are provided with thrust balancing means located axially between the main and balancing thrust bearing means and exerting a positively directed axial force on the main thrust bearing means and a negatively directed axial force on the balancing thrust beating means.

The term thrust bearing in this application is used to mean bearings which transfer at least axial loads, i.e. pure axial beatings as well as bearings transferring both axial and radial loads.

A rotary screw machine with such a thrust balancing arrangement is disclosed in U.S. Pat. No. 4,915,514, which hereby is incorporated by reference. In that disclosure the general advantages gained by a thrust balancing device are discussed as well as the particular advantages attained by the above specified kind of thrust balancing, namely longer running life for the thrust bearings and a simplified exchange of bearings.

In that known device, the main thrust beating means transfer axial forces in the positive direction only whereas the balancing thrust beating means transfer axial forces in both directions. A preloading spring acts on the balancing thrust bearing means, securing a proper axial localisation of the rotor so that a certain play between the high pressure end of the rotor and the adjacent end wall is assured when the machine is at rest or idles. At operation the positively directed axial gas Forces on the rotor are partly balanced by a piston of the thrust balancing means acting on the outer ring of the balancing thrust bearing means in the negative axial direction. The balancing force is mainly received in that gas from the high pressure side of the machine is conducted to the piston to act thereon. The balancing force will be larger than the force from the preloading spring with the effect that the resulting force on the outer ring of the balancing thrust bearing means is negatively directed, which force is transmitted to the rotor and counteracts the axial gas forces. The main thrust bearing means therefore need to transfer only the remaining part of the axial gas forces.

This known device functions satisfactory for applications where the discharge pressure (when the machine is a compressor) is above a certain level, in which case it is possible to dimension the piston large enough to attain a force which is larger than the preload force. The available space for the piston, however, is limited, which in cases when the discharge pressure is not so high will raise problems to attain a balancing force exceeding the preloading force, which has to be above a certain level. In such cases, e.g. when the machine is a refrigeration compressor using refrigerant of the type R134a, the known device therefore cannot function satisfactory.

SUMMARY OF THE INVENTION

The object of the present invention is to improve the known thrust balancing device so that it is capable of functioning also at lower pressure levels at its high pressure side.

According to the invention this has been achieved in that there is provided clamping means acting on the main thrust bearing means in the positive direction and the main thrust bearing means are capable of transferring axial forces in both directions and the balancing thrust bearing means are capable of only transferring forces which act on the shaft in the positive direction.

Since according to the invention, there is no preloading in the positive direction on the balancing thrust bearing means, it is attained that the force from the thrust balancing means on the thrust balancing bearing means is entirely available for the balancing without the need to first compensate a preloading force. The desired effect thus can be achieved also with lower forces for the actuation of the thrust balancing means.

The solution according to the invention also has the advantage that the balancing thrust bearing means also can be of a cheaper kind. Since these bearings are exchanged at shorter intervals than the main thrust bearing means the total bearing costs will be reduced.

BRIEF DESCRIPTION OF THE DRAWINGS

The invention will be further explained through the following detailed description of a preferred embodiment thereof and with reference to the accompanying drawings.

DETAILED DESCRIPTION

Figure 1:
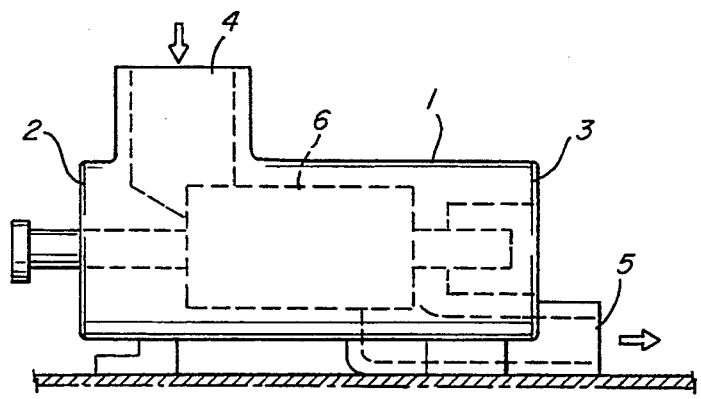
FIG. 1 is a schematic side view of a rotary screw compressor.

The rotary screw compressor illustrated in FIG. 1 has a pair of intermeshing screw rotors 6 operating in a casing I having a low pressure end section 2 and a high pressure end section 3. The working medium, e.g. refrigerant R134a enters the compressor through an inlet channel 4 and after being compressed leaves the compressor through an outlet channel 5. Each rotor is mounted in bearings in both end sections 2, 3. The pressure difference between the low and high pressure ends of the compressor during operation results in that the gas exerts an axial force on each rotor from the high pressure end towards the low pressure end. This is defined as the positive axial direction.

Figure 2:
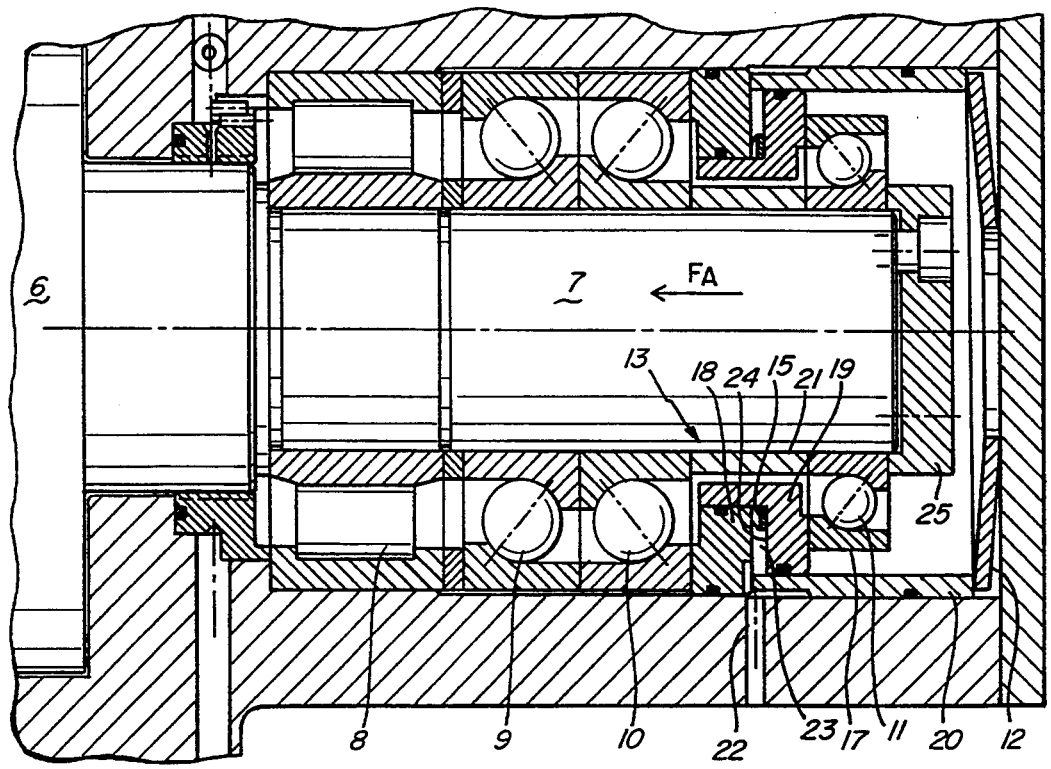
FIG. 2 is a section through a shaft journal of a rotor in a rotary screw compressor according to the invention.

FIG. 2 is a section through the shaft journal 7 of one of the rotors in the high pressure end section 3, and the arrow $F_A$ represents the positively directed axial force on the rotor. The shaft journal 7 is mounted in a plurality of bearings, namely a radial roller bearing 8 and thrust ball bearings 9, 10 and 11 as seen in order from the rotor to the end of the shaft journal 7. The two inner thrust ball bearings 9, 10 constitute the main thrust bearings and each of them is of the kind capable of transferring axial forces in only one direction. One is mounted to transfer forces in the positive direction and the other one in the negative direction so that they taken together are capable of transferring forces in both directions. The thrust ball bearing 11 at the outer end of the shaft journal is a thrust balancing bearing and is separated from the main thrust bearings 9, 10 by a distance sleeve 21. The thrust balance bearing is capable of transferring axial forces acting on the shaft journal 7 in the positive direction only. All the bearings 8, 9, 10, 11 are kept in place by a key disc 25 at the end of the shaft journal 7.

Axially between the main thrust bearings 9, 10 and the balancing thrust bearing 11 a thrust balancing device 13 is provided, which consists of two annular members 18, 19 defining a sealed annular chamber 23 between them. The annular chamber 23 communicates with a pressure medium channel 22 establishing fluid communication with the working fluid at the discharge side of the compressor. The annular chamber accommodates a thrust spring 15 which holds the annular members 18 and 19 apart and preloads the thrust balancing bearing 11.

A cup spring 12 clamps the outer rings of the main thrust ball bearings 9, 10, the clamping force being transmitted by a sleeve 20 and the annular member 18 of the thrust balancing device 13. Alternatively the sleeve 20 and the annular member can be made as a single unit. By the clamping force it is secured that the rotor will be axially fixed at rest or when the compressor idles, and thus the rotor I cannot come into contact with the adjacent high pressure end wall.

When loaded the discharge pressure is transmitted to the annular chamber 23 through the pressure medium channel 22, and the pressure acting on the inner surface 24 of the annular member 19 exerts a negatively directed force on the outer ring 17 of the balancing thrust bearing 11, which force thus counteracts the gas force $F_A$ therewith reducing the axial force that has to be transferred by the thrust ball bearing 9 of the main thrust bearing means.

As should be obvious to a person skilled in the art various modifications can be made without departing from the scope of the invention. For example the two bearings of the main thrust bearing means could be replaced by a double-acting thrust bearing and each bearing could of course be replaced by two or more bearings performing the same function.

I claim:

1. A rotary screw machine having a low pressure side and a high pressure side, for use with a gaseous working medium, comprising:

a casing (1) having a low pressure end section (2) and a high pressure end section (3);

at least one screw rotor (6) operating in said casing, said at least one rotor (6) at operation being exposed to axial gas forces ($F_A$) in a positive axial direction from said high pressure end section (3) towards said low pressure end section (2), and said at least one rotor (6) having at least one shaft journal (7) mounted in bearings (8, 9, 10, 11) in one of said end sections of said casing (1), said at least one shaft journal (7) having an outer end;

said bearings (8, 9, 10, 11) including thrust bearing means (9, 10, 11) with main thrust bearing means (9, 10) adjacent to said at least one rotor (6) and balancing thrust bearing means (11) adjacent said outer end of said at least one shaft journal (7);

said thrust bearing means (9, 10, 11) including thrust balancing means (13) located axially between said main thrust bearing means (9, 10) and said balancing thrust bearing means (11) and exerting a positively directed axial force on said main thrust bearing means (9, 10) in said positive axial direction, and a negatively directed axial force on said balancing thrust bearing means (11) in a negative axial direction which is opposite to said positive axial direction;

clamping means (12) acting on said thrust bearing means (9, 10, 11) in said positive axial direction, said clamping means (12) acting only on said main thrust bearing means (9, 10) of said thrust bearing means (9, 10, 11); and said main thrust bearing means (9, 10) transferring axial forces in both of said positive and negative axial directions, and said balancing thrust bearing means (11) only transferring forces which act on said shaft journal (7) in said positive axial direction.

2. The rotary screw machine of claim 1, wherein said thrust balancing means (13) includes spring means (15).

3. The rotary screw machine of claim 2, wherein said thrust balancing means (13) further includes fluid-pressure actuated means (18, 19).

4. The rotary screw machine of claim 3, wherein said fluid-pressure actuated means includes two annular members (18, 19) which are axially expandable and form an annular pressure chamber (23) between each other, said annular pressure chamber (23) being in communication with a gas channel (22) establishing a fluid-connection between said annular pressure chamber (23) and said high pressure side of the rotary screw machine.

5. The rotary screw machine of claim 1, wherein said clamping means (12) comprises a cup spring.

6. The rotary screw machine of claim 1, wherein:
   said main thrust bearing means comprises two single-acting thrust bearings (9, 10) transferring forces in opposite directions; and
   said balancing thrust bearing means comprises only one single-acting thrust bearing (11).

7. The rotary screw machine of claim 2, wherein said clamping means (12) comprises a cup spring.

8. The rotary screw machine of claim 2, wherein:
   said main thrust bearing means comprises two single-acting thrust bearings (9, 10) transferring forces in opposite directions; and
   said balancing thrust bearing means comprises only one single-acting thrust bearing (11).

9. The rotary screw machine of claim 3, wherein said clamping means (12) comprises a cup spring.

10. The rotary screw machine of claim 3, wherein:
    said main thrust bearing means comprises two single-acting thrust bearings (9, 10) transferring forces in opposite directions; and
    said balancing thrust bearing means comprises only one single-acting thrust bearing (11).

11. The rotary screw machine of claim 4, wherein said clamping means (12) comprises a cup spring.

12. The rotary screw machine of claim 4, wherein:
    said main thrust bearing means comprises two single-acting thrust bearings (9, 10) transferring forces in opposite directions; and
    said balancing thrust bearing means comprises only one single-acting thrust bearing (11).

* * * * *